Aug. 5, 1969
J. V. McNULTY
3,459,169
CHAIN SAW FOR CUTTING VERY HARD MATERIALS
AND HAVING PLUNGE CUTTING MEANS
Filed Aug. 12, 1966
3 Sheets-Sheet 1
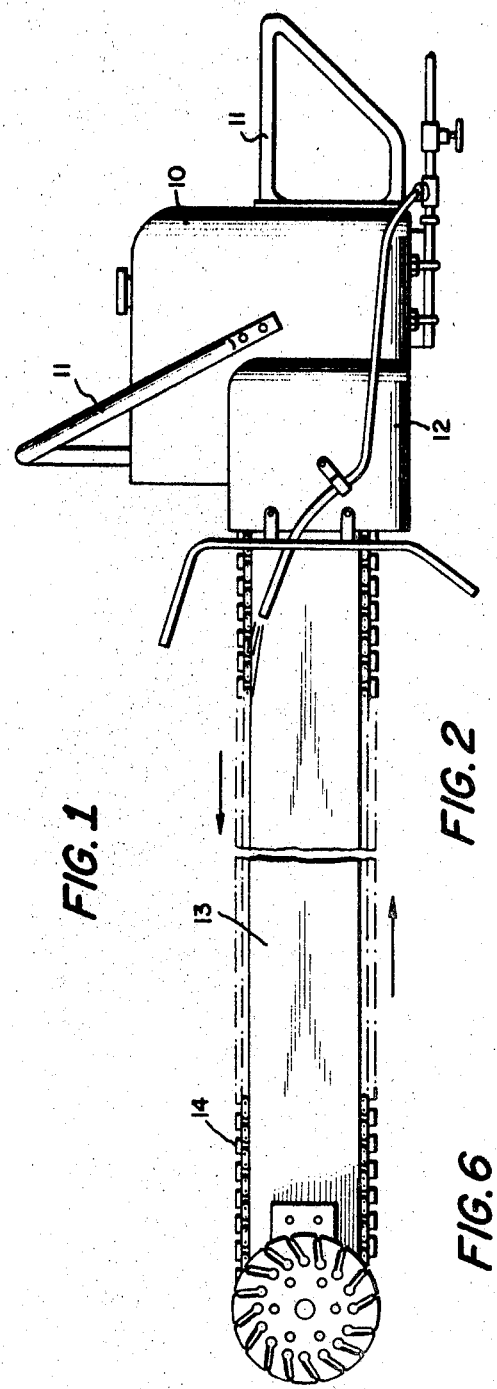
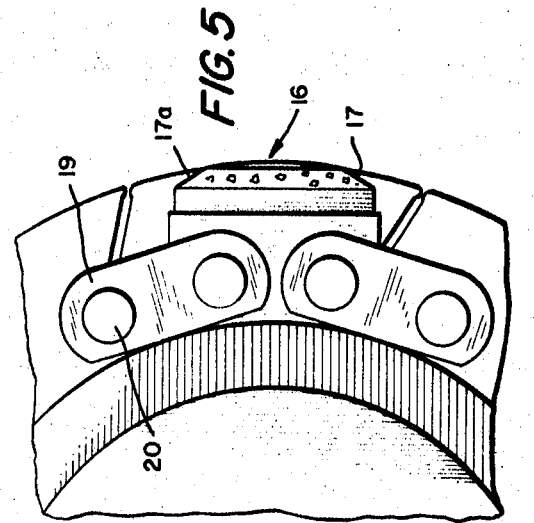
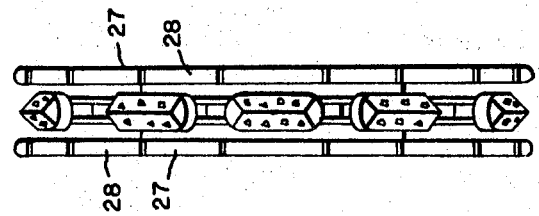
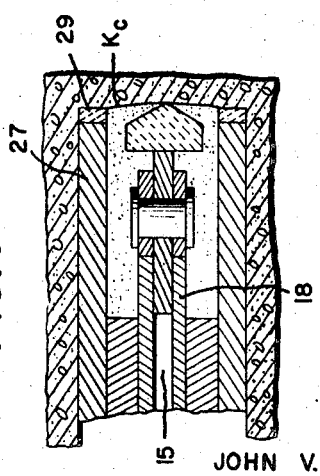
INVENTOR
JOHN V. McNULTY
BY Wenderoth, Lind & Ponack
ATTORNEYS INVENTOR
JOHN V. McNULTY

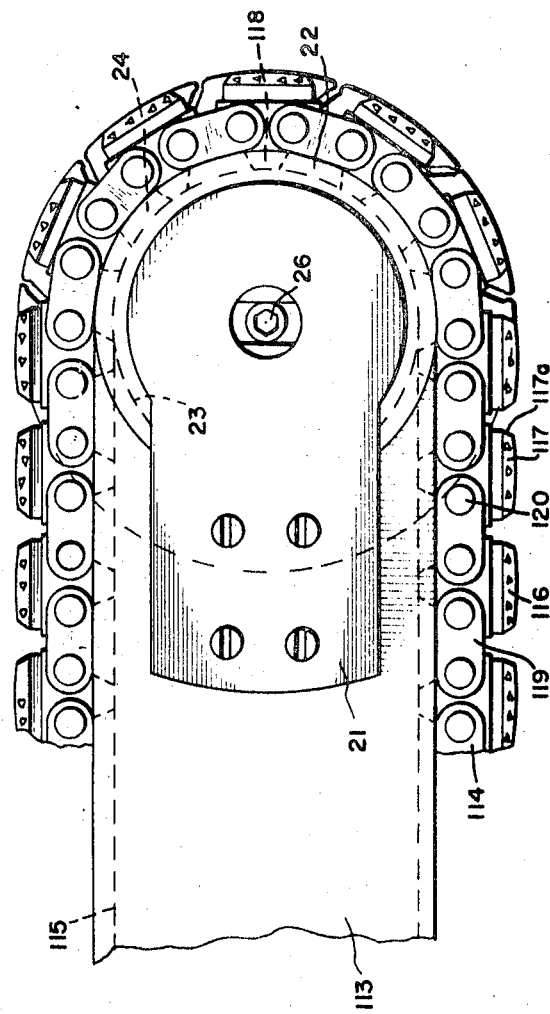

United States Patent Office 3,459,169
Patented Aug. 5, 1969

3,459,169
CHAIN SAW FOR CUTTING VERY HARD MATERIALS AND HAVING PLUNGE CUTTING MEANS
John V. McNulty, Norwich, N.Y., assignor to Northern Lumber Company, Inc., Poland, N.Y.
Filed Aug. 12, 1966, Ser. No. 572,138
Int. Cl. B28d 1/08, 1/12
U.S. Cl. 125—21                              2 Claims

ABSTRACT OF THE DISCLOSURE

A chain type saw for cutting very hard materials. A motor drives a chain around a bar and a nose wheel on the free end of the bar. The chain has tooth members with very hard particles projecting therefrom and engages the nose wheel for driving it. Circular saw blades are provided on opposite sides of the nose wheel and are rotated by the nose wheel. The saw can thus be used both for plunge cutting and linear cutting of such materials such as reinforced concrete.

---

The present invention relates to a chain saw for cutting very hard materials, such as concrete, stone, and the like, and more particularly relates to such a saw having means on the nose thereof whereby a so-called plunging cut can be made with the saw.

Heretofore, when it has been necessary to make a cut in a concrete wall or similar structural element which has no free edge, it has been necessary first to cut one or more holes in the wall with a core bit, and only then can a saw be inserted through the thus formed hole and a sawing operation carried out. This of course requires that there be two sets of tools available, one for using the core bit, and the saw for sawing once the hole has been made in the wall by means of the core bit.

A chain type saw which is described as being able to cut through hard material and make a plunging cut is disclosed in U.S. Patent No. 2,912,968. However, in order to make the plunging cut, i.e. a cut in which the teeth on the chain which are moving around the nose of the bar perform a cutting action, the teeth are curved so that they act on the curved bottom surface of the kerf. When the chain runs along a kerf having a straight bottom surface, of course only the points of tangency of the teeth will perform any cutting action. The patentee recognizes this particular problem, and as one solution he proposes compound teeth, i.e. teeth which have the central portions straight and the end portions curved. Manifestly, this is only a compromise solution, since when the curved portions of the teeth are cutting, the straight portions will not be active, and vice versa. Moreover, there is an additional problem of the forces on the teeth when they are cutting in this fashion are very high and there is a strong tendency for the chain to weaken and break. An increase in the strength of the chain members cannot be made sufficiently great to overcome this tendency.

It is an object of the present invention to provide a chain type saw which overcomes the disadvantages of the prior art type of devices, and which can be used to make a plunging cut. One embodiment of such a chain saw can also cut linearly, and thus can make both types of cuts efficiently.

The chain on the saw of one embodiment of the present invention has diamond studded teeth which have substantially straight cutting profiles, which have an inverted V-shaped cross section, and which are beveled on the ends thereof. In attempting to make a plunging cut with a saw equipped only with a chain having teeth of this shape, it was found that the tooth members, and particularly the points on the teeth where the bevel and pointed edge intersect, were doing substantially all of the work, and the chain was becoming overloaded and breaking, and the teeth were being destroyed.

One embodiment of the present invention provides a solution to this problem by attaching a circular saw blade having diamond studded teeth on each side of the nose of the bar of this chain type saw, the blades having a radius of curvature which is substantially the same as that of the path along which the points on the teeth move as the chain moves around the nose of the bar. These circular blades are driven from the movement of the chain, and perform a cutting action along lines parallel to the path of the chain. As a result, they make two parallel slots at the nose of the saw, while the chain which moves along between the blades removes the very hard material being cut from between the slots made by the saw blades. As a result, the saw can readily make a plunging cut through a very hard material, and can also be used to make a linear cut along the very hard material once the very hard material has been cut through.

In another embodiment, there is provided a so-called starting device which makes only a plunging cut. In such a device the bar and chain are much shorter and the profile of the teeth on the chain as well as that of the circular blades is curved substantially the same as the curvature of the cut to be made.

The invention will now be described in greater detail in the following specification in connection with the accompanying drawings, in which:

FIG. 1 is a side elevation view of one embodiment of a chain type saw according to the present invention;

FIG. 2 is an end elevation view, on an enlarged scale, of the nose end of the chain type saw of FIG. 1;

FIG. 5 is an enlarged detail view showing the relationship of the teeth and the saw blades;

FIG. 6 is a sectional view taken on line 6—6 of FIG. 4; and

FIG. 7 is a view similar to FIG. 3 showing a second embodiment of a chain saw according to the present invention.

Figure 3:
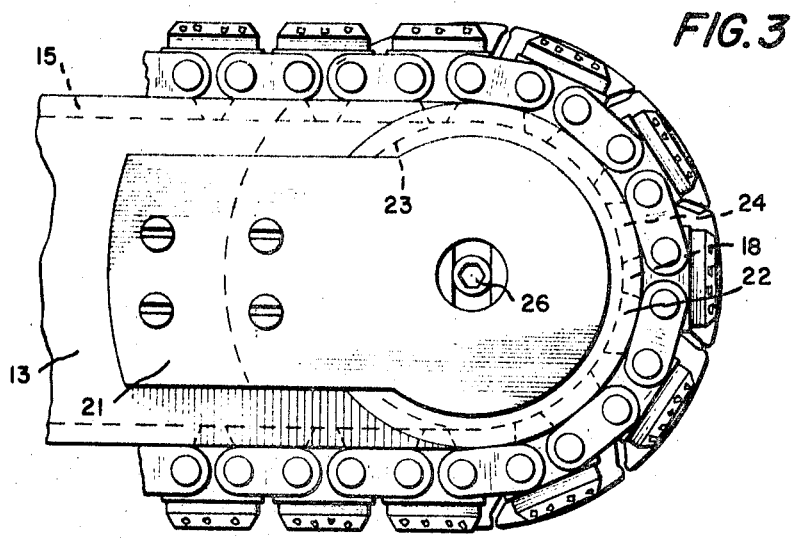
FIG. 3 is a side elevation view, on an enlarged scale, of the nose end of the chain type saw of FIG. 1 with the circular saw blade on the near side of the bar removed.
Figure 4:
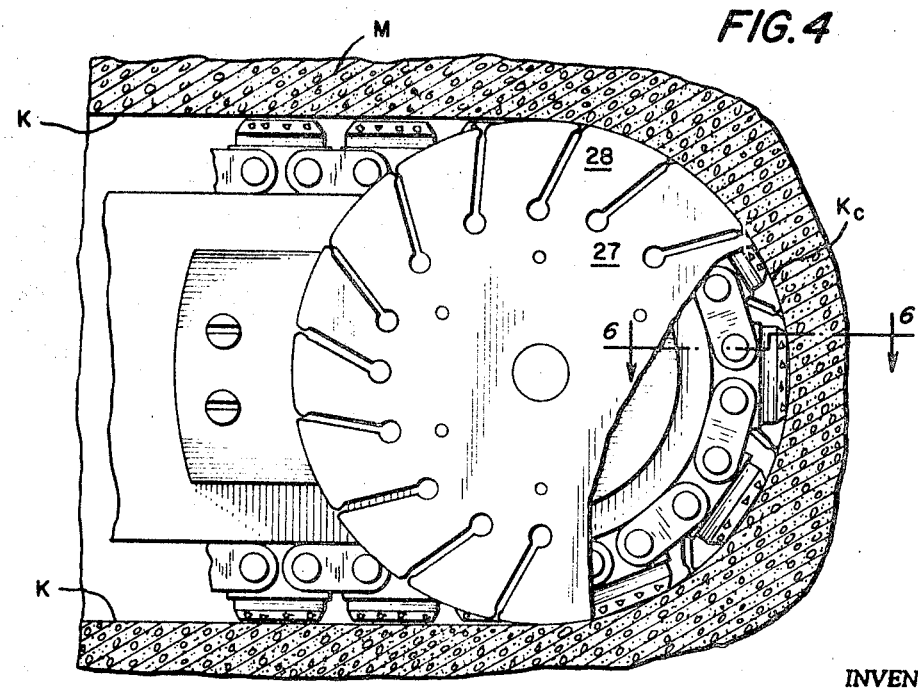
FIG. 4 is a view similar to FIG. 3 with the blade partly broken away and showing the saw in the process of making a plunging cut.

The chain saw of FIGS. 1–6 comprises a conventional motor housing 10 which has the usual handles 11 thereon and in which is contained the driving motor for driving the chain. The particular saw shown has a gasoline driven motor, but it will of course be understood that the drive could be any other kind, such as compressed air or electric. On the housing 10 is a bar mounting member 12 within which is housed the sprocket (not shown) for driving the chain in the direction indicated by the arrows, and mounted within the bar mounting member 12 is the bar 13 along which runs the chain 14. The bar 13 has a groove 15 therein, and the chain is comprised of tooth members 16 having cutting portions 17 having a straight profile and an inverted V-shaped cross section and beveled end portions 17a and very hard particles, such as diamonds, projecting therefrom. The tooth members each have a downwardly extending guide projection 18 which runs in the groove 15 and is guided by the groove. The tooth members 16 are connected by links 19 secured to the individual tooth members by rivets or pins 20.

Mounted on the nose end of the bar 13 by means of bolts or the like is a nose wheel bracket 21 which has a nose wheel 22 rotatably mounted thereon. Nose wheel 22 has a groove 23 around the periphery thereof which is the same depth as the groove 15 in the bar 13, and with the nose wheel 22 in position, the groove 15 runs smoothly into the groove 23. Likewise, the outer peripheral surface of the nose wheel 22 is the same diameter as the width of the nose of the bar 13, so that the surface of the edges of the bar 13 runs smoothly into the peripheral surface of the nose wheel 22. In this way, the chain 14 is led around the nose of the bar by the guide projections 18 on the individual teeth running in the groove 23 and the links 19 running on the peripheral surface of the nose wheel. Positioned in the bottom of the groove 23 are sprocket projections 24 which are engaged with the guide projections 18 so that the nose wheel 22 is driven by the movement of the chain therearound.

A shaft 26 having a polygonal cross-section is secured to the nose wheel 22 and is turned thereby, and mounted on the opposite ends thereof, i.e. on opposite sides of the nose wheel 22, and closely adjacent thereto are two circular saw blades 27, each having a plurality of teeth 28 thereon having diamonds or like hard particles projecting from a matrix 29 on the cutting portions on the ends of the teeth. The radius of the cutting portion of the circular saw blades 27 is substantially the same as the radius of the points of the tooth members where the apex of the inverted V-shaped cutting portions 17 are intersected by the beveled end portions 17a.

It will be seen from FIGS. 5 and 6 that the result of this arrangement is that when the chain 14 is moving along the nose wheel and driving it by the engagement of the projections 18 with the sprocket projections 24, the circular saw blades 27 rotate with the points of the tooth members 16 and the peripheral cutting portions of the teeth 28 on the circular saw blades 27 moving along substantially the same cylindrical surface. The points on the teeth member 16 thus do not bear all of the stresses of the cutting action, and the chain is not subjected directly to the stresses set up by the cutting action, most of these stresses being taken by the curved surfaces of the teeth 28 on the circular saw blades. The cutting portions 17 of the teeth 16 act mostly to remove the material from between the slots cut by circular saw blades 27 to form a substantially cylindrical curved portion $K_c$ of the kerf $K$ which is formed when the nose of the saw is forced against and into the material M to be cut. In practice, it has been found that with the arrangement as shown and described, a saw can readily cut through a twelve inch thick wall made of reinforced concrete in a matter of a few minutes.

It will of course be understood that once the plunging cut has been made through the complete thickness of the wall or similar structure, any further cut is preferably made with the straight run of the chain 14 along the bar 13. Thus, in cutting a door through a concrete wall, a plunging cut would first be made near the top of one vertical side edge of the door, using the plunge cutting means of the present invention, and then the vertical edge of the door opening would be cut using the straight bottom run of the chain. Then a second plunging cut could be made at one end of the top edge of the door and a second horizontal cut made using the straight run of the chain. Then a third plunging cut could be made at the top of the other vertical side edge of the door and that side edge cut.

In order to enhance the cutting action of the plunge cutting means of the saw of the present invention, means are provided for directing a flow of water or similar cooling and washing liquid along the upper straight run of the chain 14 which is moving into the material being cut, and in the direction in which the chain is running through the cut. In the present embodiment, this means comprises a pair of tubes 30, one mounted on each side of the bar mounting member 12 by means of a clamp 13. The open end of each of the tubes is directed slightly inwardly toward the bar 13 and slightly upwardly at a point just below the upper run of the chain at the motor housing end of the bar. The other ends of the tubes 30 are connected to a Y branch fitting 32 at the end of a water supply pipe or hose 33 in which is a valve 33 for controlling the pressure at which the liquid is supplied to the tubes 23.

During the operation of the chain saw to make a plunging cut, the valve 33 is turned so as to direct water at relatively low pressure, e.g. city water pressure, from the tubes 30 against the surface of the bar 13 and the upper run of the chain 14. The water will, when it strikes the surface of the bar 13, fan out slightly, as shown in FIG. 3, and will run along the length of the bar for a short distance, the water clinging due to the so-called Coanda or "wall" effect. Most of the water will be picked up by the moving chain 14 and driven along the bar 13, the groove 15 and the links 19 and teeth 16 of the chain, and due to the velocity imparted by the chain, the Coanda or "wall" effect will cause the water to cling to both the bar and the chain. A stream of water moving substantially at the chain velocity will thus be carried into the plunging cut, and when it reaches the point where the chain 14 starts around the nose wheel 22, the water will be driven against the bottom of the curved portion of the kerf $K_c$ and will sweep around this portion and rapidly sweep out all of the particles which have been removed from the material being cut by the toothed members 16 and saw blades 27. The stream of water will then move rapidly, being still somewhat under the influence of the rapidly moving chain, along the bottom surface of the kerf and will be discharged at the surface of the material being cut.

While the disclosed embodiment shows the tubes 30 as being positioned below the chain 14 and pointing upwardly toward it, it is of course possible to point the tubes downwardly at a slight angle to the direction of movement of chain from a point slightly above the chain. It is also possible to have a tube just above the chain where it enters the material being cut and directed along the chain.

This embodiment of a chain type saw can make a so-called plunging cut, yet has a chain which can make regular linear cuts efficiently. The chain saw of this embodiment of the invention, besides being of particular value to those engaged in the ordinary construction operations where cutting very hard materials is involved, is particularly valuable to those engaged in emergency type operations, such as rescue operations where it is necessary to break through a concrete wall into a building or an elevator shaft. The same saw can be used to cut through the wall as is used to cut the opening after the initial aperture is cut. A separate set of tools and separate core bits are unnecessary, the chain type saw functioning to make both types of apertures, cuts through the wall and cuts along the wall.

A second embodiment of the invention is shown in FIG. 7. While the embodiment of FIGS. 1–6 is satisfactory for making both plunging cuts and linear cuts, it will be appreciated that there is some sacrifice in efficiency in making plunging cuts due to the fact that the profile of the teeth 17 is straight. This is of course necessary in order to make a linear cut with any degree of efficiency. However, where the saw is for emergency use, or plunging cuts are only occasionally made, the combined type of saw is satisfactory. Where there is a commercial type of operation involved, such a contractor who has been hired to cut a series of openings, for example doors in a building, it may be of advantage from the overall cost standpoint to have a saw-like device which is for the sole purpose of making a plunging cut which is a starting cut for the insertion of a saw which will make only linear cuts. It is this type of device which is shown in FIG. 7.

The starter device, or starting saw, comprises driving means (not shown) similar to the embodiment of FIGS.

1–6, a sprocket wheel for driving the chain 114, and a bar 113 having a groove 115 therein. The principal difference in these elements is that the bar 113 will be relatively short as compared to the bar 13 of the embodiment of FIGS. 1–6, and the chain will be correspondingly reduced in length. This is because it is only necessary to have the bar long enough to pass through a wall or the like to be cut in a direction perpendicular to the plane thereof.

The chain 114 has tooth members 116 joined to each other by links 119 attached to the tooth members by pins 120, and the tooth members have downwardly extending guide projections 118 which guide the chain along the groove 115. The tooth members have cutting portions 117 having a curved profile with the same curvature as the cut to be made, and can also have an inverted V-shaped cross-section and beveled end portions 117a. The cutting portions 117 have very hard particles, such as diamonds, projecting therefrom.

The remainder of the structure of the device at the nose portion thereof is the same as the embodiment of FIGS. 1–6. The nose wheel 22, shaft 26, and circular saw blades 27 are the same as in the said first embodiment. Likewise, a means for supplying a stream of water directed along the chain 114 can be provided, although this is not shown.

The operation of the starter device is the same as that of the first embodiment as far as making a plunging cut is concerned. The difference is in the results produced thereby, the starter device being more efficient because a greater length of the tooth profile is in contact with the material being cut during the plunging cut. Thus, a commercial type operation can economically make a series of plunging cuts with the starter device, and then follow along with a saw for making linear cuts to complete the cutting operations.

The devices of this invention are efficient, being able to cut through walls faster than conventional core bits, and because of the use of the circular saw blades, the chain is useful for a much longer period of time, both for making plunging cuts and conventional linear cuts, than would be the case otherwise.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:
1. A chain type saw for cutting very hard materials, said saw having motor means, a bar mounted on said motor means and having a groove therearound, a nose wheel rotatably mounted at the nose end of said bar remote from said motor means and having a peripheral groove therein, a chain driven by said motor means and running in said groove in said bar and around the groove in said nose wheel, said chain having tooth members with very hard particles projecting therefrom, said tooth members having a straight profile with beveled ends with points where the beveled ends meet the straight profile, said nose wheel being engaged by said chain so as to be driven thereby, and circular saw blades on opposite sides of said nose wheel and closely adjacent thereto and connected thereto for rotation therewith, said circular saw blades having teeth thereon with cutting portions with very hard particles projecting therefrom, the cutting portions having a radius substantially the same as the radius of the meeting points on the chain tooth members.

2. A chain type saw for cutting very hard materials, said saw having motor means, a bar mounted on said motor means and having a groove therearound, a nose wheel rotatably mounted at the nose end of said bar remote from said motor means and having a peripheral groove therein, a chain driven by said motor means and running in said groove in said bar and around the groove in said nose wheel, said chain having tooth members with very hard particles projecting therefrom, said nose wheel being engaged by said chain so as to be driven thereby, and circular saw blades on opposite sides of said nose wheel and closely adjacent thereto and connected thereto for rotation therewith, said circular saw blades having teeth thereon with cutting portions with very hard particles projecting therefrom, the cutting portions having a radius substantially the same as the radius of points on the chain tooth members which lie along the profile of the chain tooth members as they move along said nose wheel, said tooth members having a curved profile of the same radius as that of the cutting portions on said circular saw blades.

References Cited

UNITED STATES PATENTS

| | | | |
|---|---|---|---|
| 939,438 | 11/1909 | Nielsen | 144—73 |
| 1,031,175 | 7/1912 | Garnett | 144—73 |

FOREIGN PATENTS 815,631   7/1959   Great Britain.

OTHELL M. SIMPSON, Primary Examiner

U.S. Cl. X.R.

175—89, 91; 299—82